United States Patent [19]

Martin

[11] 4,188,277

[45] Feb. 12, 1980

[54] PROCESS FOR DESALTING PETROLEUM OILS

[75] Inventor: Robert B. Martin, Spring, Tex.

[73] Assignee: Petrolite Corporation, St. Louis, Mo.

[21] Appl. No.: 960,801

[22] Filed: Nov. 14, 1978

Related U.S. Application Data

[60] Division of Ser. No. 867,417, Jan. 6, 1978, which is a continuation-in-part of Ser. No. 784,392, Apr. 4, 1977, Pat. No. 4,149,958.

[51] Int. Cl.² .................. B01D 17/06; C10G 33/02
[52] U.S. Cl. .................................................. 204/190
[58] Field of Search ................................ 204/186–191

[56] References Cited

U.S. PATENT DOCUMENTS

| 1,838,922 | 12/1931 | Fisher | 204/305 |
|---|---|---|---|
| 2,041,954 | 5/1936 | Prutzman | 204/302 |
| 2,855,360 | 10/1958 | Waterman | 204/304 |
| 2,894,895 | 7/1959 | Turner | 204/302 |
| 2,963,414 | 12/1960 | Waterman | 204/302 |
| 3,577,336 | 5/1971 | Shirley | 204/302 |

Primary Examiner—T. M. Tufariello
Attorney, Agent, or Firm—Sidney B. Ring; Hyman F. Glass

[57] ABSTRACT

A desalter/dehydrator having a plurality of electrified coalescing stages in a single vessel, wherein the stages are isolated hydraulically to allow parallel or serial stage operations. In one embodiment, several electrical stages, each separately energized, are operated in parallel to proportionately increase vessel throughput capacity. In another embodiment, series operation is employed, wherein each successive stage receives the product from the preceding stage as feed, with fresh water being added. Placement of electrodes, distributors, collectors, etc. are determined by the type of operation to be performed in the vessel.

10 Claims, 8 Drawing Figures

4,188,277

PROCESS FOR DESALTING PETROLEUM OILS

This application is a division of allowed Application Ser. No. 867,417, filed Jan. 6, 1978, which is a continuation-in-part of application Ser. No. 784,392, filed Apr. 4, 1977, now U.S. Pat. No. 4,149,958, granted Apr. 17, 1979.

FIELD OF THE INVENTION

This invention relates to apparatus and process useful for desalting and/or dehydrating oil-continuous emulsions such as crude petroleum oils, although they can be used in the resolution of other emulsions, which term is herein used as including dispersions. More particularly, the invention relates to such apparatus and process employing multiple electrode/distributor systems located in a single vessel.

BACKGROUND OF THE INVENTION

It is conventional to desalt or dehydrate oil-continuous emulsions by introducing such emulsions directly into an electric treating field of sufficient intensity to coalesce the suspended droplets of the dispersed phase into masses of sufficient size to gravitate from the oil. The dispersed phase of such emulsions is composed of a material, usually aqueous, that is sufficiently immiscible with the oil to produce an internal or dispersed phase. Initially, the dispersed droplets are of such small size or are so stabilized that they will not readily gravitate from the oil phase. However, the electric field coalesces such dispersed droplets, and it is found that the resulting coalesced masses gravitate rapidly from the oil, usually in the same container as that in which electric treatment takes place. In a desalting operation, a quantity of water may be mixed with the incoming crude oil in a valve or other mixer, all as well known, so that a more complete removal of salt from the oil may be accomplished. Typical of such prior art dehydrator/desalters is that described in U.S. Pat. No. 2,880,158 to Delber W. Turner and a version for use on shipboard described in U.S. Pat. No. 3,736,245 to Frederick D. Watson and Howell R. Jarvis. Other related prior art U.S. Pat. Nos. are the following:

| 2,033,446 | 2,527,690 | 2,848,412 | 3,250,695 | 3,592,756 |
| 2,072,888 | 2,543,996 | 2,892,768 | 3,531,393 | |
| 2,443,646 | 2,557,847 | 2,894,895 | 3,557,336 | | and German Patent No. 1,014,076 (Helmut Stock; Aug. 22, 1957).

It is an object of this invention to provide a dehydrating/desalting apparatus, especially useful for desalting crude oil, that employs multiple electrode/distributor systems located in a single vessel to achieve serial stage desalting and/or vastly increased oil handling capacity in a parallel stage operation.

It is a further object of this invention to provide a process for desalting crude oil in a plurality of serial stages.

Further objects of the invention will be evident to those skilled in the art in the course of the following description.

SUMMARY OF THE INVENTION

In accordance with this invention, there is provided an electric treater for resolving oil-continuous emulsions and other emulsions and for desalting of liquids such as crude oil, such treater comprising a closed vessel provided with a plurality of coalescing stages with no impermeable barriers between them. The stages are substantially isolated hydraulically to allow parallel or serial stage operation, each stage being provided with electrode means which provide an electric field to cause coalescing of the dispersed phase, ordinarily water or brine, the electric fields being superimposed.

The system is composed of multiple electrode assemblies, each with individual distributor systems with the hydraulics controlled to isolate the individual stages to allow multiple stage operation. The system can also be used to process oils by utilizing the separate electrode/distributor assemblies for parallel flow of material through the system. The use of two or three stages is preferred, although a greater number may be employed.

When employed for serial stage desalting, collector pumps are arranged between successive coalescing stages and conduits provided so that the treated liquid from one stage is returned as the feed for the succeeding stage. The electrodes are preferably horizontally disposed planar electrodes in vertically spaced relationship. The treatment vessel may be in the form of a sphere, a horizontally elongated cylinder substantially longer in length than in width, or of other suitable form.

When employed for parallel stage desalting, a common conduit means is employed for supplying oil-water emulsion to each of the distributor systems.

DETAILED DESCRIPTION OF THE INVENTION

The invention is illustrated by but not limited to the following exemplary embodiments.

Referring to the drawings.

Figure 1:
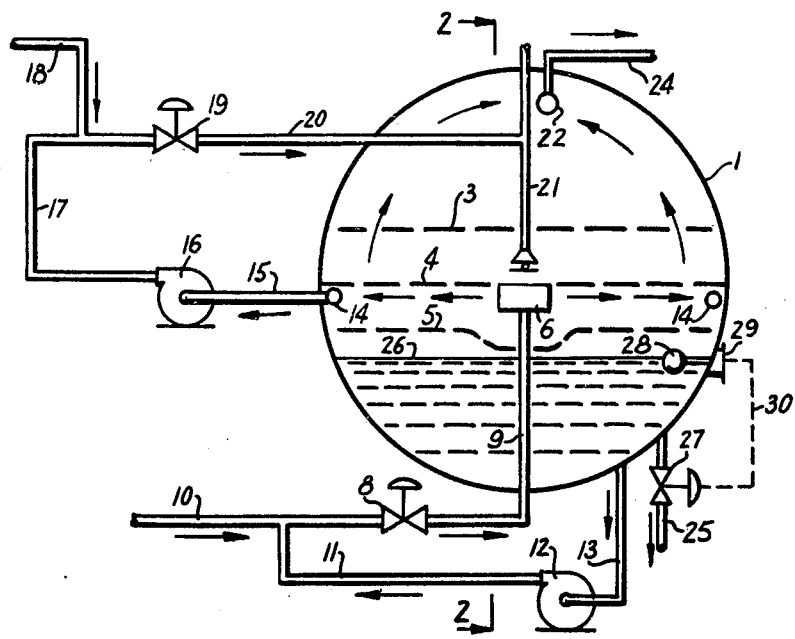
FIG. 1 is a transverse vertical cross section of one embodiment of an electrical treater of the present invention intended for serial stage operation.
Figure 2:
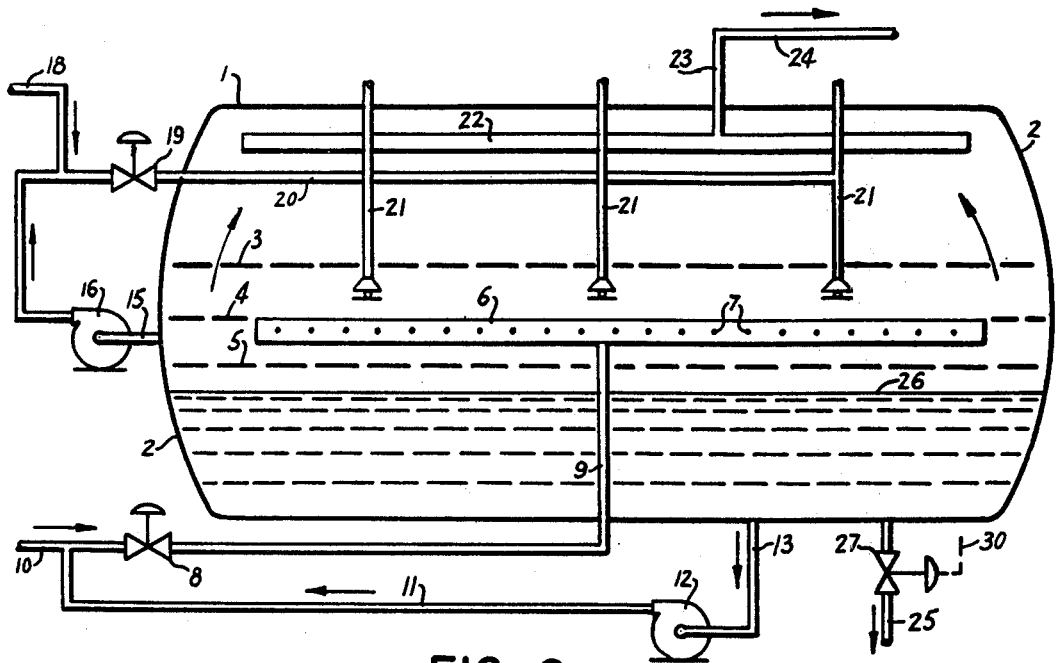
FIG. 2 is a longitudinal vertical cross section taken along line 2—2 of the electrical treater shown in FIG. 1.

FIGS. 1 and 2 illustrate one embodiment of the invention, especially useful when it is desired to convert an existing Petreco high velocity desalter to two stage series operation. The desalter consists of a horizontally disposed generally cylindrical vessel 1 having rounded ends 2, which may suitably have a diameter of about 8 to 14 feet. Lengths of about 25 feet and 49 feet and as much as 133 feet have proved suitable with a 12 foot diameter vessel. Inside the vessel 1 are three horizontally disposed planar electrodes 3, 4 and 5. Upper electrode 3 and bottom electrode 5 extend almost the entire length and width of the vessel 1, electrode 5 being downwardly curved in the vicinity of its longitudinal axis to accommodate distributor 6. These electrodes are energized. Middle electrode 4, which is at ground potential, is in contact with the wall of vessel 1. The electrodes 3, 4 and 5 are spaced about 6 to 15 inches apart, 10 inches being very suitable. Each electrode may be a grid of metal rods or pipes, suitably of cold finished steel, of a structure similar to that shown in U.S. Pat. No. 2,880,158.

A distributor 6, serving as the first stage distributor, and shown here as a box-like conduit or header, extends horizontally for most of the length of vessel 1 just under middle electrode 4, to which it may be attached, and along its longitudinal axis. Bottom electrode 5 may be downwardly curved as shown in the vicinity of its longitudinal axis to accommodate distributor 6. Orifices 7 are provided in the sides of the conduit all along its length. However, instead of a box-like conduit, a pipe with holes drilled in it may be substituted. Distributor 6 is supplied by mixing valve 8 via conduit or riser pipe 9. Mixing valve 8 is supplied by oil conduit 10 and water conduit 11, which may be connected with pump 12 and recycle conduit 13, as shown, and/or a fresh water source not shown. Interstage outlet collectors 14, which may be drilled pipes supported at the vessel wall with angle clips (not shown) extend longitudinally along the sides of tank 1, and are connected to conduit 15 which leads to oil recycle pump 16 and thence to conduit 17. Conduit 18, connected to a fresh water source, leads into conduit 17, which leads to mixing valve 19. A conduit 20 extends from mixing valve 19 to distributor modules 21, which may be similar in structure to that shown in Turner U.S. Pat. No. 2,543,996 or Turner U.S. Pat. No. 2,527,690. Although three such modules are shown here, a lesser or greater number may be employed. For example, in a 49 foot long vessel, four such modules may be used. An outlet collector 22, which may be a pipe with holes drilled in the upper wall, extends horizontally along the top of tank 1 and leads to outlet 23 and conduit 24. A water effluent conduit 25 is connected to the lower part of vessel 1.

In operation, the temperature of the crude oil depends upon the crude specific gravity and the type of crude. However, in many cases of crude oil, temperatures of between about 100° F. and 350° F., with about 250° F. being optimum, are used. The pressure must be sufficient to keep the oil and water mixture liquid at the operating temperature. The crude oil is charged by conduit 10 and water is added via conduit 11, which is supplied by recycle conduit 13. The oil may be brought to the desired temperature by any suitable procedure, such as by heat exchange with another refinery stream. The amount of water added is suitably about 10% of the crude oil charged. The two fluids are mixed in mixing valve 8 to form an emulsion. The emulsion is carried through riser pipe 9 to the first stage distributor 6, from whence it flows between middle electrode 4 and bottom electrode 5 in either direction in a generally horizontal transverse direction toward the sides of the vessel 1 where the interstage collectors 14 are located. Water which has been thrown out of emulsion by the electric field between electrodes 4 and 5 falls toward the bottom of vessel 1, where a pool of collected water is maintained. The main portion of the treated oil is taken up by collectors 14 and is pumped by interstage pump 16 to conduit 17. A 5% addition of fresh water takes place in this conduit and is emulsified into the oil by mixing valve 19. The second stage emulsion thus formed is carried by conduit 20 to second stage distributors 21 from whence it flows between electrodes 3 and 4 in either direction, more or less transversely, to the sides of the vessel 1. The treated oil passes upwardly near the edge of electrode 3 and along the sides of the vessel 1 and leaves the vessel by means of outlet collector 22, outlet 23 and conduit 24. The arrows shown in the figures indicate the path of the fluids through the conduits and, in a general way, inside the vessel 1.

The level of the interface 26 of the water with the treated oil may be maintained automatically at the desired position in the lower portion of vessel 1. As shown in the drawings, this is accomplished by means of motor valve 27 on effluent conduit 25, which valve is actuated between open and closed positions by a float 28 connected to a control unit 29, which delivers an actuating signal through an interconnection, indicated by dashed line 30, to valve 27. The float 28 senses the water level interface 26, and the valve 27 is controlled to maintain the interface 26 at the desired level in the lower portion of vessel 1. Other liquid level control means for maintaining the interface 26 at the desired level, such as an electrical capacitance probe, may be employed.

While the above described embodiment is of special interest in the conversion of existing desalting units having distributors 21 already present, desalters are also contemplated and within the scope of this invention wherein both the first and second stage distributors may take the form of the boxlike conduit 6 or drilled pipe. Similarly, both first and second stage distributors may take the form of distributors 21. Moreover, either or both stage distributors may be supported by and supplied either from the top or bottom of vessel 1, or otherwise.

In the embodiment described above, the top and bottom electrodes 3 and 5 are each energized with its own transformers, here not shown, and the middle electrode 4 is at ground potential. However, it is also contemplated and within the scope of this invention that the top and middle electrode be charged individually and the bottom electrode grounded. A potential difference of about 15,000 to 33,000 volts may suitably be maintained between electrodes 3 and 4 and between electrodes 4 and 5. The energized electrodes may be opposed electrodes if single phase current is employed or two legs of a three phase current (3 phase open Δ) where the grounded electrode is the middle one. Moreover, if a three phase system is used, all three electrodes may be energized. The supports and circuitry for the electrodes are omitted in FIGS. 1 and 2 but may be the same as that shown in FIG. 3, described below.

Figure 3:
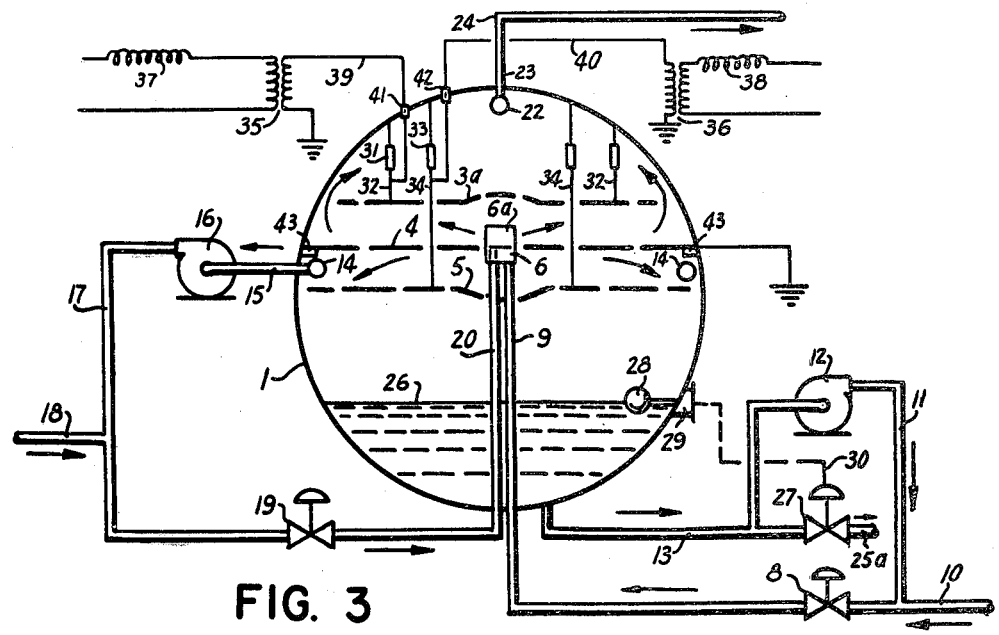
FIG. 3 is a transverse vertical cross section of another electrical treater of this invention intended for serial stage operation.

FIG. 3 is a representation of a vertical cross-section of an embodiment of the invention using a horizontal cylindrical vessel 1 with boxlike conduits 6 and 6a as distributors in both stages and otherwise similar in its main features and operation to that shown in FIGS. 1 and 2. The reference numerals in this figure correspond to those employed in FIGS. 1 and 2 for the same or similar features.

In this embodiment distributors 6 and 6a are both fed from below by riser pipes 9 and 20, respectively. The water leaves vessel 1 by means of a single conduit 13 which supplies recycle water to conduit 11 and effluent to conduit 25a. Motor valve 27 on conduit 25a is actuated by a signal from control unit 29. Upper electrode 3a in this embodiment is upwardly curved in the vicinity of its longitudinal axis to accommodate distributor 6a, being symmetrical in this respect to bottom electrode 5.

Electrode 3a is suspended by one or more vertical insulators 31 and rods 32, as required to support the weight of the electrode. Similarly electrode 5 is suspended by one or more vertical insulators 33 and rods 34. Electrodes 3 and 5 are energized by transformers 35 and 36, respectively. The middle electrode 4 is at ground potential. It is suitably fastened to the vessel 1, for example, by means of attached rail bars 43, vessel 1 being grounded. As shown here, transformers 35 and 36 are step up transformers having reactors 37 and 38 in series with the respective primaries. The secondaries have one end grounded and energize conductors 39 and 40, respectively, which connect through entrance bushings 41 and 42, respectively, to electrodes 3a and 5.

Figure 4:
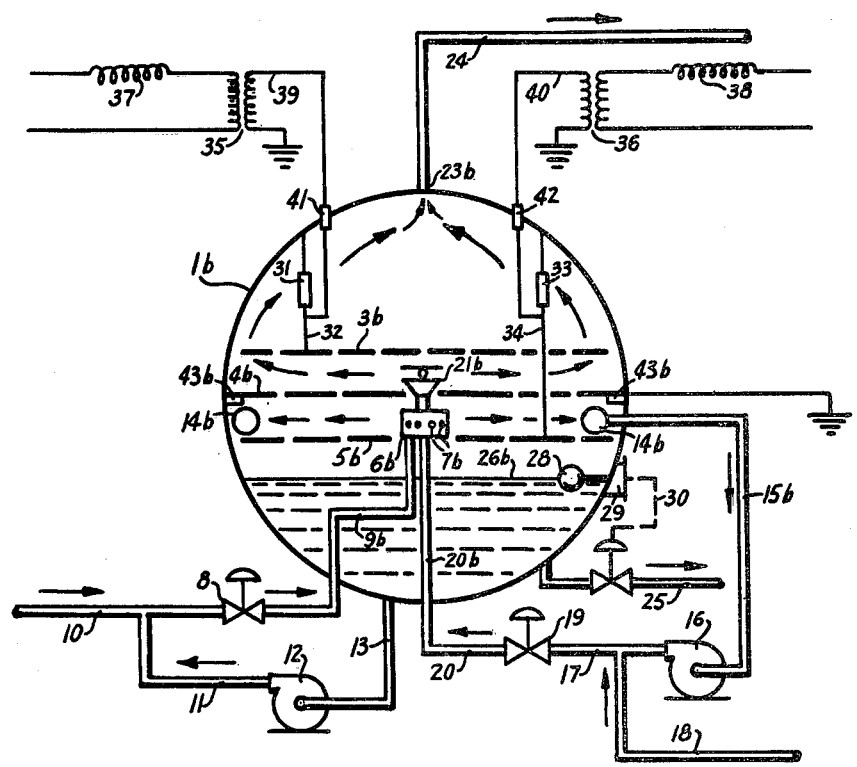
FIG. 4 is a vertical cross section of yet another electrical treater of this invention intended for serial stage operation.

FIG. 4 is a representation of a vertical cross section of a spherical desalter such as the Petreco spherical desalter which has been converted to two stage series operation. The reference numerals in this figure also correspond to those employed in FIGS. 1 and 2 for the same or similar features. Vessel 1b is a spherical container which may have a diameter of up to 42 feet, suitably 18 feet. In this embodiment, both first and second stage distributors 6b and 21b are brought in and supplied from the bottom of the vessel. The first stage distributor 6b is, as shown here, a circular box supplied by conduit 9b and built around riser pipe 20b and having orifices 7b around its periphery to control flow distribution. Electrodes 3b, 4b and 5b are circular, as required to fit the cross section of the spherical vessel 1b, electrode 4b being suitably fastened to the vessel 1b, for example, by means of attached rail bars 43b, vessel 1b being grounded. Collectors 14b, which may be drilled pipes arcuately shaped to conform to the sides of vessel 1b, and supported at the vessel wall with angle clips (not shown), are positioned to take up the main portion of the oil treated in the first stage. The treated oil is carried by conduit 15b to recycle pump 16. The operation of this desalter is otherwise similar to the embodiments described above.

In each of the above described embodiments, the exit velocity from the drilled pipe distributor or the orifices of the distributor 6 or 6b is such that there is enough inertial energy to carry the emulsion in a horizontal plane between the treating electrodes 4 and 5 or 4b and 5b to the interstage collectors 14 or 14b. These collectors are located to collect the first stage treated oil and some "override" of fluid from the second stage of treatment. The interstage pumping rate is controlled so that it exceeds the rate at which the treated oil is withdrawn from the unit by the second stage outlet collector. This may be accomplished by operating the recycle pump 16 at a pumping rate 10 to 20% faster than the initial charging rate.

Figure 5:
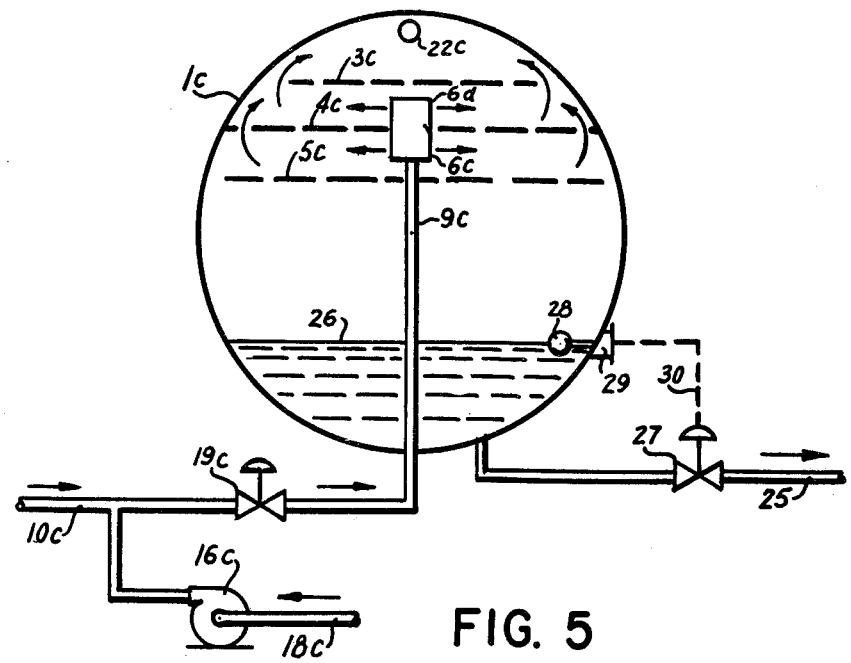
FIG. 5 is a vertical cross section of an electrical treater of this invention intended for parallel stage operation.

FIG. 5 is a representation of a vertical cross section of a desalter having two parallel stages. Such a system has the potential of doubling the oil handling capacity of a typical single electrode, single distributor system. The reference numerals in this figure correspond to those employed in FIGS. 1 and 2 for the same or similar features. In this embodiment, riser pipe 9c supplies both distributors 6c and 6d, shown here as the boxlike conduit type. In operation, about 5% of water by volume based on the oil feed is introduced by conduit 18c and pump 16c and is mixed in mixing valve 19c with crude oil introduced in conduit 10c. The mixture then passes into conduit 9c. The oil-water mixture is distributed in two parallel paths, one between electrodes 3c and 4c and the other between electrodes 4c and 5c, electrodes 3c and 5c being energized and 4c being at ground potential. The oil-water mixture travels toward the sides of vessel 1 in each instance and thence upward toward outlet collector 22c where the treated oil is withdrawn. The salt containing water is separated from the oil-water mixture by the passage between the electrodes and drops downwards into the pool of water at the bottom of the vessel 1c, the level of which, represented by interface 26, is maintained by effluent conduit 25, float 28, control unit 29, interconnection 30 and motor valve 27, as described in connection with FIGS. 1 and 2.

Three or more separate electrode-distributor systems can also be used if higher oil handling capacities are desired.

Figure 6:
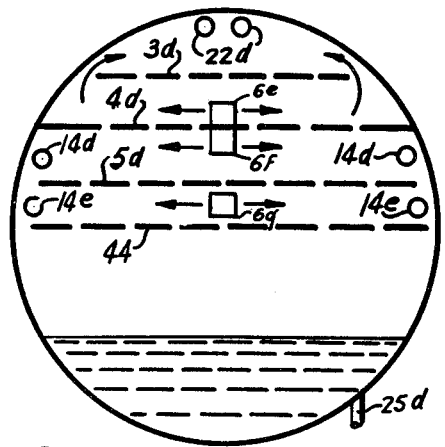
FIG. 6 is a schematic illustration of a vertical cross section of a three stage series electrical treater of this invention.

FIG. 6 is a schematic representation of a vertical cross section of a desalter employing three desalting stages in series. The reference numerals correspond to those employed in FIGS. 1 and 2 for the same or similar features. In this embodiment, a fourth planar, horizontally disposed electrode 44 is employed in addition to the three electrodes 3d, 4d and 5d, similar to those shown in the previously described embodiments. Electrode 44 is positioned below electrode 5d. Electrodes 3d, 5d and 44 are energized and electrode 4d is at ground potential. An additional distributor 6g, positioned between electrodes 5d and 44, is employed in addition to distributors 6e and 6f and a second interstage collector 14e is employed in addition to first interstage collector 14e. The distributors are all shown as boxlike conduits. In this embodiment, distributor 6g serves as the first stage distributor; distributor 6f as a second stage distributor; and distributor 6e serves as a third stage distributor. Fresh water for desalting is supplied to each desalting stage, although recycle water may be employed in the first stage. The treated product leaves the vessel 1 through outlet collectors 22d and water is removed through outlet 25d. The various conduits, valves and pumps removing and supplying fluids to and from the various stages and the electrical circuitry are not shown, but their nature will be evident from the descriptions of the embodiments shown in FIGS. 1 to 4.

In an analogous manner to that of FIG. 6, desalters with more than three stages may be constructed.

Figure 7:
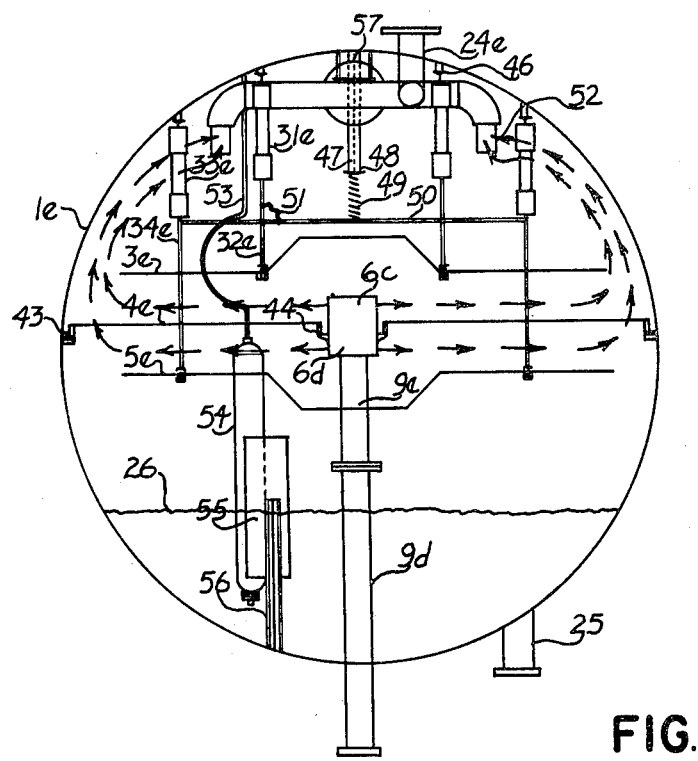
FIG. 7 is a transverse vertical cross section of another embodiment of the electrical treater of present invention intended for parallel stage operation.
Figure 8:
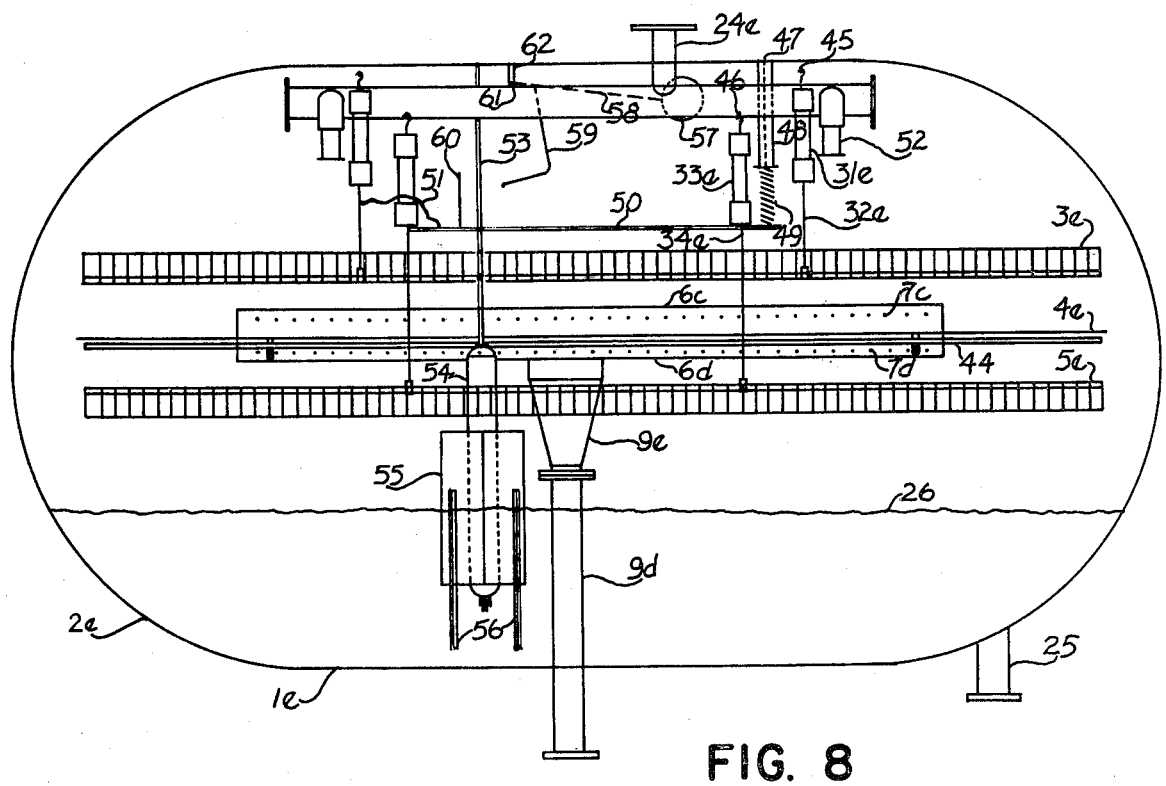
FIG. 8 is a longitudinal vertical cross section of the electric treater shown in FIG. 7.

FIGS. 7 and 8 are representations of transverse and longitudinal cross sections, respectively, of the internal details of a desalter having two parallel stages, such as shown in FIG. 5. The embodiment shown is especially useful in the conversion of an existing Petreco low velocity desalter to parallel stage operation. The reference numerals in these figures correspond to those employed in FIGS. 1, 2, 3 and 5 for the same or similar features. As shown in FIGS. 7 and 8, the desalter comprises a horizontal cylindrical vessel 1e with hemispheric heads 2e. Upper and lower portions, 6c and 6d, respectively, of a box-like conduit type distributor extend horizontally for most of the length of vessel 1e and are equipped with rows of orifices 7c and 7d along its length on both sides. The distributor is supplied with oil-water emulsion produced by a mixing valve, not shown, by riser pipe 9d and riser pipe extension 9e. Grounded electrode 4e is supported at the sides of vessel 1e and the distributor by rail bars 43 and 44, respectively. Charged electrodes 3e and 5e are supported by vertical insulators 31e and 33e, respectively, and rods 32e and 34e, respectively, said insulators being supported from the upper part of the wall of vessel 1e, as by hooks 45 and 46, and stabilized structurally by tie-rods 50, which also serve as electrical conductors. Power is transmitted to the charged electrodes 3e and 5e by a wire conductor 47 passing through entrance bushing stub 48, spring contactor 49, tie-rods 50 and from thence by rods 34e to electrode 5e and by monel tiller rope 51 and rods 32e to electrode 3e. Outlet collector 22e, supplied with vortex spoilers 52 at its intakes, leads to product effluent conduit 24e. The level of the interface 26 between the water and the oil is maintained by a level control, not shown, which is actuated by displacer hanger rod 53, connected to displacer 54, a weighted, tubular sealed float, which moves up and down with the level change. (The water layer is not shown in section so as not to obscure details of the drawing.) Displacer 54 is guided by displacer shield 55 which is supported by supports 56. Displacer 54 is designed to exert a predetermined tension rod 53 under the operating pressure and temperature, with the bottom half of the displacer in the water layer and the top half in the oil layer. Since there is not a sharp demarcation between the two layers, displacer 54 is made long to allow for an emulsion of oil and water to exist at the oil-water interface. The predetermined tension on rod 53 is transmitted to a level control sensor instrument, not shown, which converts the tension stress into torsion which twists a torque tube. This in turn causes movement of a Bourdon tube which affects the air being delivered to actuate a water bleed valve, not shown, on an effluent conduit, also not shown, connected to outlet 25. A rise in the water level lessens the tension on rod 53 and a fall in the water level increases it, causing the water bleed valve to open or close and thus readjust the water level to balance the forces in the control system. Water effluent outlet 25 is located in the lower portion of vessel 1e. A low level float 57 operates to maintain safety when vessel 1e is not liquid full. If the liquid level falls to a predetermined position, electrically conductive arm 59 attached to float lever 58, also electrically conductive, makes contact with conductor 60, attached to tie-rod 50. Float lever 58 is connected to pivot point 61 on support 62, which is connected structurally to vessel 1e. When arm 59 contacts conductor 60, conductor 60 is thus electrically connected with the grounded vessel 1e. Any vapor accumulation in vessel 1e concomitant with the drop in liquid level thus causes float 57 to drop and a short circuit to occur. With the short circuit and resultant reactance, the voltage to the transformer is so reduced that no high voltage is admitted to electrodes 3e and 5e via conductor 47. Therefore, the possibility of a spark and resulting explosion if air were also present in the vapor is avoided. The mode of operation of this embodiment is otherwise as described in connection with FIG. 5, the path of the oil being shown by the arrows.

A horizontal parallel stage desalter as above described, measuring 8 feet in internal diameter and 6 feet horizontally, tangent to tangent, was used to treat 48° API waxy Michigan crude oil. The oil was treated at 260° F. with 1 pint of liquid demulsifier consisting of a mixture of an oxyalkylated phenol-formaldehyde resin, an ammonium salt of an alkaryl sulfonate and an acylated polyalkanolamine, all in solvent, added per 1000 barrels of crude oil (said demulsifier being a Tretolite ® demulsifier of the Tretolite ® DS series of demulsifiers), the pressure differential across the mixing valve being 10 p.s.i.g., the voltage being 440 volts and the load 10 amperes. A charge rate of 6500 barrels per day was employed, the crude being desalted from 80 pounds to 1 pound per thousand barrels of oil. Bottom sediment and water (BS&W) in and out was 0.2%. In another run, at a temperature of 253° F., the desalted oil contained 18 pounds per thousand barrels with 400 volts and a 23 ampere load. Other Tretolite ® demulsifiers of the Tretolite ® DS series or any functionally equivalent desalting liquid demulsifier may also be used.

Other electrode arrangements than those described in the above embodiment may be employed in parallel stage desalting, for example, arrangements corresponding to those described in connection with FIGS. 1 and 2, above. Similarly the oil temperature and pressure parameters and potential difference between electrodes described in connection with FIGS. 1 and 2 apply also to parallel stage desalting.

The various distributors, collectors and electrodes described above may be supported in part by conventional means well known in the art, such as guy wires, in addition to being supported by the conduits and other support means disclosed.

It will be apparent from the foregoing description that the invention is not limited to a particular shape of vessel, electrical circuitry, voltage employed, type of distributors, water level control means, arrangement of conduits, etc. Many embodiments, modifications, developments, and variations of forms are contemplated as long as they fall within the broad scope of the appended claims.

I claim:

1. A process for desalting a petroleum oil comprising emulsifying said oil with water to form a first stage emulsion, passing said emulsion between horizontally disposed electrodes contained in a treating vessel, whereby said emulsion is subjected to an electric field and the emulsion is broken, allowing de-emulsified water to fall towards the bottom of the vessel, collecting the so-treated first stage product, maintaining a pool of water in the lower portion of said vessel, emulsifying the first stage product with fresh water to form a second stage emulsion, passing said second stage emulsion between horizontally disposed electrodes in a path substantially parallel to but above that followed by the first stage emulsion and hydraulically substantially isolated therefrom but with no impermeable barriers between the stages, whereby the second stage emulsion is broken, allowing de-emulsified water to fall towards the bottom of the vessel into said pool of water, allowing the treated second stage product to rise between the edges of the upper electrode and the wall of the vessel, and withdrawing desalted product from the upper portion of said vessel and water from the lower portion of said vessel.

2. The process of claim 1, wherein said electric fields are superimposed, the upper electrode of said first stage serving as the lower electrode of said second stage.

3. The process of claim 2 wherein the level of water in the lower portion of said vessel is maintained at a predetermined position.

4. The process of claim 2, wherein the top and bottom electrodes are energized and the middle electrode is at ground potential.

5. The process of claim 2, wherein the top and middle electrodes are energized and the bottom electrode is at ground potential.

6. The process of claim 2, wherein the top, middle and bottom electrodes are all energized.

7. A process for desalting a petroleum oil comprising emulsifying said oil with water to form a first stage emulsion, passing said emulsion between horizontally disposed electrodes contained in a treating vessel, whereby said emulsion is subjected to an electric field and the emulsion is broken, allowing de-emulsified water to fall towards the bottom of the vessel, collecting the so-treated first stage product, maintaining a pool of water in the bottom portion of said vessel, emulsifying the first stage product with fresh water to form a second stage emulsion, passing said second stage emulsion between horizontally disposed electrodes in a path substantially parallel to but above that followed by the first stage emulsion, whereby the second stage emulsion is broken, allowing de-emulsified water to fall towards the bottom of the vessel into said pool of water, collecting the so-treated second stage product, and repeating in at least one additional stage the steps of emulsifying the treated product of the previous stage with fresh water, breaking the resulting emulsion by passing it between horizontally disposed electrodes in a path substantially parallel to but above that followed by the previous stage emulsion, allowing the de-emulsified water to fall towards the bottom of the vessel into said pool of water and collecting the so-treated product; withdrawing the collected desalted product from the upper portion of the vessel and water from the lower portion of the vessel; the path of the emulsions in the respective stages being hydraulically substantially isolated from each other, but with no impermeable barriers between the stages.

8. The process of claim 3, wherein said electric fields are superimposed, the upper electrode of each stage except the last serving as the lower electrode of the stage next above.

9. The process of claim 8, wherein the level of water in the lower portion of said vessel is maintained at a predetermined position.

10. The process of claim 8, wherein there are three stages, defined by four electrodes, and the electrode next below the top electrode is at ground potential and the other electrodes are energized.

* * * * *